United States Patent
Blanco et al.

(10) Patent No.: US 9,886,464 B2
(45) Date of Patent: Feb. 6, 2018

(54) VERSIONED BLOOM FILTER

(71) Applicants: Rolando Blanco, Waterloo (CA);
Muhammed Sharique, Pune (IN);
Chaitanya Gottipati, Hyderabad (IN);
Mihnea Andrei, Issy les Moulineaux (FR); Thomas Legler, Walldorf (DE);
Peter Gregor Steinemann, Mannheim (DE)

(72) Inventors: Rolando Blanco, Waterloo (CA);
Muhammed Sharique, Pune (IN);
Chaitanya Gottipati, Hyderabad (IN);
Mihnea Andrei, Issy les Moulineaux (FR); Thomas Legler, Walldorf (DE);
Peter Gregor Steinemann, Mannheim (DE)

(73) Assignee: SAP SE, Walldorf (DE)

( * ) Notice: Subject to any disclaimer, the term of this patent is extended or adjusted under 35 U.S.C. 154(b) by 606 days.

(21) Appl. No.: 14/552,905

(22) Filed: Nov. 25, 2014

(65) Prior Publication Data
US 2016/0147806 A1    May 26, 2016

(51) Int. Cl.
*G06F 17/30* (2006.01)

(52) U.S. Cl.
CPC .. *G06F 17/30324* (2013.01); *G06F 17/30011* (2013.01); *G06F 17/30336* (2013.01); *G06F 17/30424* (2013.01)

(58) Field of Classification Search
CPC ........ G06F 17/30324; G06F 17/30011; G06F 17/30424; G06F 17/30336
See application file for complete search history.

(56) References Cited

U.S. PATENT DOCUMENTS

| | | | |
|---|---|---|---|
| 6,266,662 B1 * | 7/2001 | Ozbutun | G06F 17/30324 707/700 |
| 2005/0108368 A1 * | 5/2005 | Mohan | H04L 29/06 709/220 |
| 2011/0288975 A1 * | 11/2011 | Pearson | G06Q 40/12 705/34 |
| 2013/0080725 A1 * | 3/2013 | Usui | G06F 3/061 711/162 |
| 2016/0080404 A1 * | 3/2016 | Kohout | H04L 63/1425 726/23 |

* cited by examiner

*Primary Examiner* — Albert M Phillips, III
(74) *Attorney, Agent, or Firm* — Sterne, Kessler, Goldstein & Fox P.L.L.C.

(57) ABSTRACT

Disclosed herein are system, method, and computer program product embodiments for bloom filter versioning. A request to add a new value to a first bitmap is received, wherein the first bitmap includes a bit sequence corresponding to a most recently added value. It is determined that the first bitmap has exceeded a threshold. A second bitmap is generated, the second bitmap including more bits than the first bitmap. The first bitmap is deleted based upon a determination that a number of readers accessing the first bitmap is zero.

20 Claims, 3 Drawing Sheets

VERSIONED BLOOM FILTER

BACKGROUND

Bloom filters are used to determine whether a particular value does not exist within a database. However, as the number of values tracked by the bloom filter increases, the storage allocated to the bloom filter needs to be increased to reduce false positives. Increasing this storage allocation requires locking the bloom filter until a new storage can be allocated, which can cause system processing delays.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for bloom filter versioning.

Figure 1:
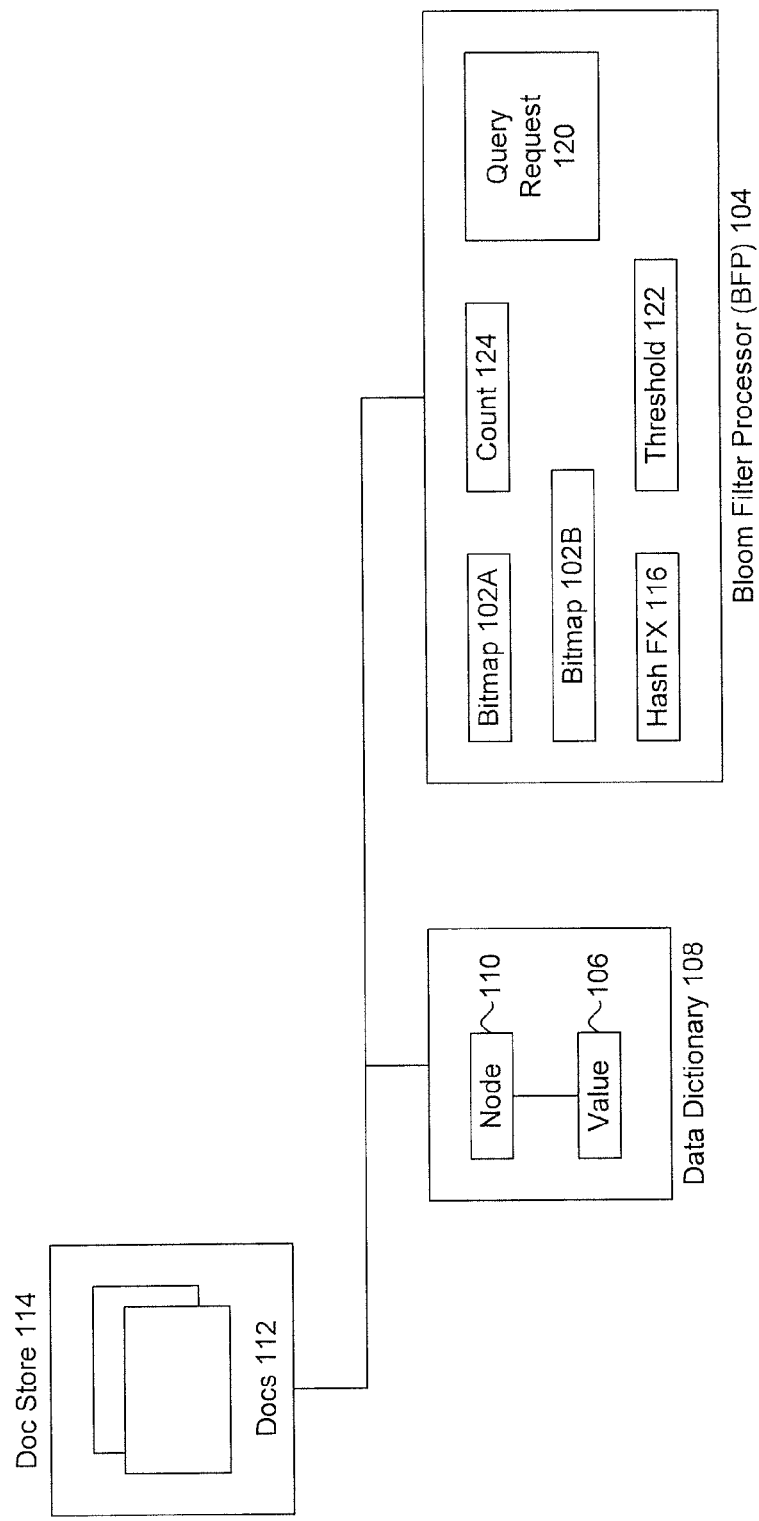
FIG. 1 is a block diagram of a system for bloom filter versioning, according to an example embodiment.

FIG. 1 is a system for 100 for bloom filter versioning, according to an embodiment. Bloom filter processor (BFP) 104 maintains one or more versions of a bitmap 102.

A bloom filter (e.g., BFP 104) may be used to determine if a particular element does not belong to a data set or set of elements. For example, BFP 104 may be used to determine if a particular value 106 does not exist within a data dictionary 108. BFP 104 saves or maximizes resource utilization by not having to perform unnecessary searches for values 106 that are known not to exist in data dictionary 108. These searches can become more and more costly as the size of the data dictionary 108 and/or the number of unique values 106 stored therein increases.

Data dictionary 108 may be any data structure that stores data or values. In an exemplary embodiment, data dictionary 108 may be a tree data structure, such as a B-tree. For simplicity, data dictionary 108 as described herein will be referred to interchangeably as a tree 108, but it would understood other data structures may be used in lieu of a tree data structure for data dictionary 108. Data dictionary 108 may store node 110-value 106 pairs corresponding to one or more documents (docs) 112 of a document (doc) store 114.

In an embodiment, system 100 may be a database system, and a doc store 114 may be a database used to store multiple documents 112. Docs 112 may be individual files or data records, such as rows of data, columns of data, or other data found in docs 112. The number of stored documents could range from very small, to very big, including upwards of a billion or more docs 112.

In an example embodiment, docs 112 may include account information for users of a particular system. For example, docs 112 (or a subset thereof) may include a name value 106 corresponding to the user's name(s) associated with one or more user accounts. Data dictionary 108 may then be used to keep track of the name information, with each unique name (e.g., first name, middle name, and/or last name) found within the documents occupying a different node 110 in tree 108. With a billion account records, there may be many repeated names, but there may also be many unique names. This large number of unique values 106 may result in a very large tree structure 108. For example, each name value 108 may occupy a unique node 110 in tree 108. Node 110 may indicate the order or location of value 106 within tree 108. For example, a first value 106 may be associated with or correspond to node 1.

BFP 104 implements hash function (fx) 116 to hash a particular value 106 into bits of a bitmap 102. In an embodiment, a hash fx 116 may correspond to each bitmap 102A and 102B. Hash fx 116 may be specified such that it only returns values within the bit range of a bitmap 102. For example, if bitmap 102A is of size 32 bits, hash fx 116 may be configured to map values 106 to bits 0-31. Then for example, if bitmap 102B is of size 64 bits, hash fx 116 or a new hash fx 116 may be configured to map values 106 to bits 0-63.

BFP 104 may receive a query request 120 for a particular value 106 being queried by a user or system. Query request 120 may include information relevant to the query, such as the queried value 106 and a corresponding field of data (e.g., such as a name, account balance, city, state, etc.). BFP 104 hashes (using the appropriate hash fx 116) the queried value 106 to determine or identify to which bit of bitmap 102A the queried value 106 corresponds or would correspond. BFP 104 may then check the identified bit in bitmap 102 to determine whether or not the bit is set. For example, if the name "Raj" is queried, "Raj" would be hashed to determine to which bit(s) of bitmap 102 corresponds to "Raj." In an embodiment, instead of being mapped to a single bit, a value may be mapped to a pre-determined number of bits. The bits may be located near each other (e.g., numerically close) so as to fit within a single cache line. Throughout the specification, a value is described as being mapped to a single bit, however it should be understood that the description herein applies to a multi-bit environment as well.

If the "Raj" bit is not set, then BFP 104 determines that that none of docs 112 have an account with the name "Raj" 106. Then for example, system 100 does not waste time/resources searching data dictionary 108 for the queried value 106. Then, depending on the context, the user or system may be notified that "Raj" does not exist, and if desired, "Raj" may be added to the values 106 of data dictionary 108.

If, on the other hand, the "Raj" bit of bitmap 102 is set, then BFP 104 may determine that there is a possibility (within a threshold 122) that "Raj" value 106 does exist in one or more docs 112, and that data dictionary 108 should be searched.

In an embodiment, hash fx 116 may hash multiple values 106 to the same bit of bitmap 102A. This may be done, for example, to save memory, from having extremely large bitmaps that may be required if there are a large number of different values 106 and each bit of bitmap 102 corresponds to only a single value 106. Threshold 122 may specify how many values 106 may be mapped to a single bit of bitmap 102A and/or when a new bitmap 102B needs to be generated or allocated.

The framework herein provides configuration options that allow a user to specify the minimum number of values in the column after which a bloom filter is created or used. There may be another option to specify the factor by which bitmap 102 should be resized. For example, the user may be aware of the data and its entropy or diversity. As described below, BFP 104 may check to see if the size of bitmap 102A is less than the threshold 122, as determined by the resize factor and the number of values 106 in a column at that point. If the threshold 122 is reached or exceeded, bitmap 102 size (e.g., a new bitmap 102B of a larger size) may be increased.

As tree 108 grows in size, the bits of bitmap 102A may be allocated to values 106 and additional bits may be required to accommodate additional values 106. For example, the growth in size of tree 108 may correspond to the modification or addition of docs 112, which increase the number of values 106 to be stored in data dictionary 108.

In conventional systems, when new bits need to be added (e.g., a new larger bitmap needs to be created), a bloom filter and/or bitmap is locked (e.g., preventing any reads or writes on the bitmap). A new bitmap may then be created, the old values copied over, and any new bit(s) may then be set. Locking the bitmap in this fashion may result in lengthy system processing delays.

With BFP 104, the number of bits used in a bitmap 102 by BFP 104 may be increased by generating a new bitmap 102B without locking bitmap 102A. As a result, read requests may continue to process or be processed using bitmap 102A, while a new write operation processes on new bitmap 102B.

BFP 104 may receive a write request to add a new value 106 to bitmap 102A. As described herein, adding a value 106 to a bitmap 102 refers to setting the bit(s) of the bitmap 102 corresponding to a new value 106. In an embodiment, if an existing value 106 has an identical bit set in bitmap 102 as new value 106, though new value 106 may be "added" to bitmap 102, bitmap 102 may appear to be the same.

In continuing the name example above, the bit(s) for "Raj" may sought to be added to bitmap 102A. This may be the result of a new doc 112 being added to doc store 114, or an existing doc 112 being modified. The write request may be received from a writer or other thread that desires to write value 106.

BFP 104 may determine that using the existing bitmap 102A would increase the number of false positives beyond threshold 122. When this happens, rather than locking the bitmap 102A (e.g., preventing any reads or writes on the bitmap) until a larger bitmap 102B is allocated and the old values are copied over, BFP 104 allows readers to continue reading bitmap 102A and creates a new version of bitmap 10A as bitmap 102B.

For example, when a write request is received to add a new value to correspond to a bit of bitmap 102A, and BFP 104 determines that bitmap 102A is full (e.g., cannot accommodate more bits without exceeding threshold 122), a new bitmap 102B is created or allocated. Bitmap 102B is larger (has more bits) than bitmap 102A to accommodate the new value.

In an embodiment, the size of bitmap 102B may be determined based on a predetermined increase by a certain number or percentage of bits based on the previous bitmap 102A. For example, each resized bitmap 102B may be 25% larger than the previous version of the bitmap 102, the size may be doubled, or a specified number of bits may be added.

The existing values 106 may be remapped to the new bitmap 102B. For example, the values 106 of bitmap 102A may be processed by hash fx 116 corresponding to bitmap 102B and the corresponding bits of bitmap 102B may be set.

While bitmap 102B is being generated and values 106 are being remapped to bitmap 102B, readers (e.g., read requests) may continue to read and access bitmap 102A. The writer may then write the new value 106 to new bitmap 102B. Any subsequent read requests (e.g., from readers) may then be directed to bitmap 102B after the new value has been written to bitmap 102B.

BFP 104 may track how many readers are accessing a particular version of bitmap 102. For example, at any given time there may be different versions of bitmap (102A, 102B). The number of bitmaps or bitmap versions that exist may depend, at least in part, on the frequency of bitmap additions (e.g., values 106) and bitmap size adjustments. The number of readers accessing a bitmap 102 is maintained as count 124. Count 124 may be maintained in a distributed fashion without any contention across cores. This may be done, for example, by maintaining a count 124 per core up to a maximum of 64, each of which will be added to get a total reference count before trying to garbage collect a (older) version of a bitmap 102. In an embodiment, there may, for example, be a count 124 for each bitmap 102A and 102B, or just for older version(s) of a bitmap 102A.

In an embodiment, BFP 104 may generate bitmap 102B before bitmap 102A reaches threshold 122. In an embodiment, threshold 122 may indicate when bitmap 102B is to be created. For example, after every 20,000 inserts into the column, bitmap 102 may be checked to see if its size is below threshold 122, which would increase the false positive rate and a cleanup action to rebalance the bloom filter (bitmaps 102) within the increased size.

In an embodiment, threshold 122 may specify a maximum redundancy of three values 106 per bit for bitmap 102A, and that when bitmap 102A reaches 75% of the maximum values that can be tracked by bitmap 102A, a new bitmap 102B should be generated. As such, there may a time when a writer is writing a new value to bitmap 102A while bitmap 102B is being generated (e.g., to which a different or subsequent writer may be writing a value 106). In that circumstance, the writer to bitmap 102A may write to both bitmap 102A as well as bitmap 102B to ensure the value 106 being written is included in the newest version of the bitmap 102B.

After the new bitmap 102B has been created (with new value 106) and readers are directed to bitmap 102B, BFP 104 may monitor the count 124 of any previous bitmap version(s) that may exist (102A). As new readers are being directed to new bitmap 102B, and old readers are completing their access to bitmap 102A, the count 124 of bitmap 102A will continue to drop. When count 124 of bitmap 102A drops to zero, BFP 104 may mark bitmap 102A (e.g., the older version of bitmap 102) for deletion, at which point the memory allocated to that version may be freed.

Figure 2:
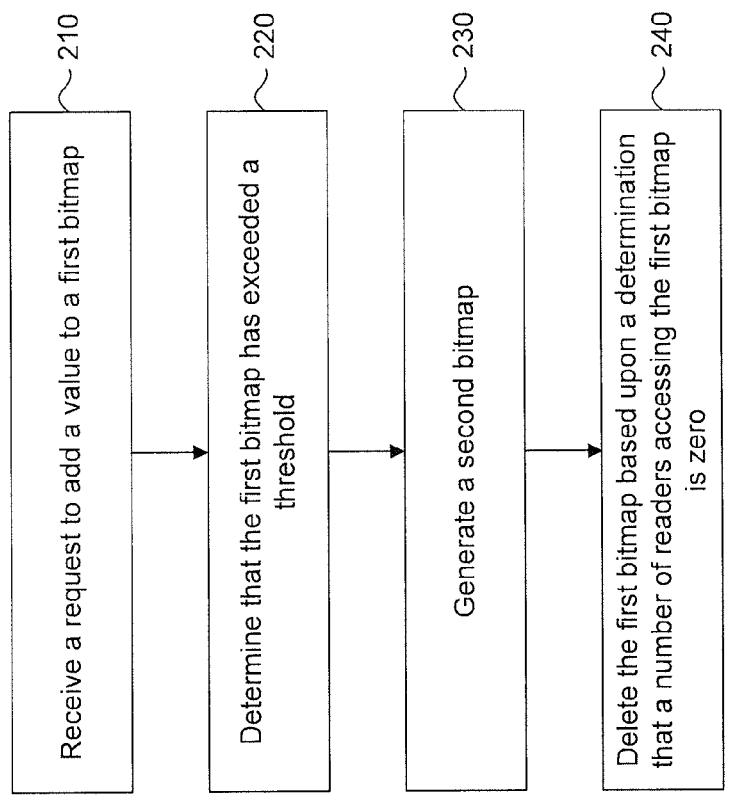
FIG. 2 is a flowchart illustrating a process for bloom filter versioning, according to an example embodiment.

FIG. 2 is a flowchart for a method 200 for bloom filter versioning, according to an embodiment. Method 200 can be performed by processing logic that can comprise hardware (e.g., circuitry, dedicated logic, programmable logic, microcode, etc.), software (e.g., instructions run on a processing device), or a combination thereof.

In step 210, a request to add a value to a first bitmap is received. For example, BFP 104 may receive a request to add a new value 106 to bitmap 102A. Bitmap 102A may already include other values 106 from data dictionary 108.

In step 220, it is determined that the first bitmap has exceeded a threshold. For example, BFP 104 may determine that bitmap 102A exceeds threshold 122. Threshold 122 may be a redundancy or false positive threshold that should not or cannot be exceeded. For example, once a particular bit sequence or set of bits is used to accommodate more than two values (or any other number), threshold 122 may be exceeded. In an embodiment, even if new value 106 does not exceed the threshold 122, BFP 104 may nonetheless determine that a new bitmap 102B is to be generated if false positive rate is within a particular range of the error threshold 122.

In step 230 a second bitmap is generated. For example, BFP 104 may generate bitmap 102B. Bitmap 102B may include more bits than bitmap 102A. In an alternative embodiment, a new bitmap 102 may be created with a higher threshold 122, so as to accompany or track more values 106. The new value 106 may then be added to bitmap 102B, and any new read requests may be directed to bitmap 102B instead of bitmap 102A.

In step 240, the first bitmap is deleted based upon a determination that a number of readers accessing the first bitmap is zero. For example, BFP 104 may be signaled when, or monitor for when count 124 corresponding to bitmap 102A drops to zero. At which point, bitmap 102A may be deleted or marked for deletion or garbage collection.

Figure 3:
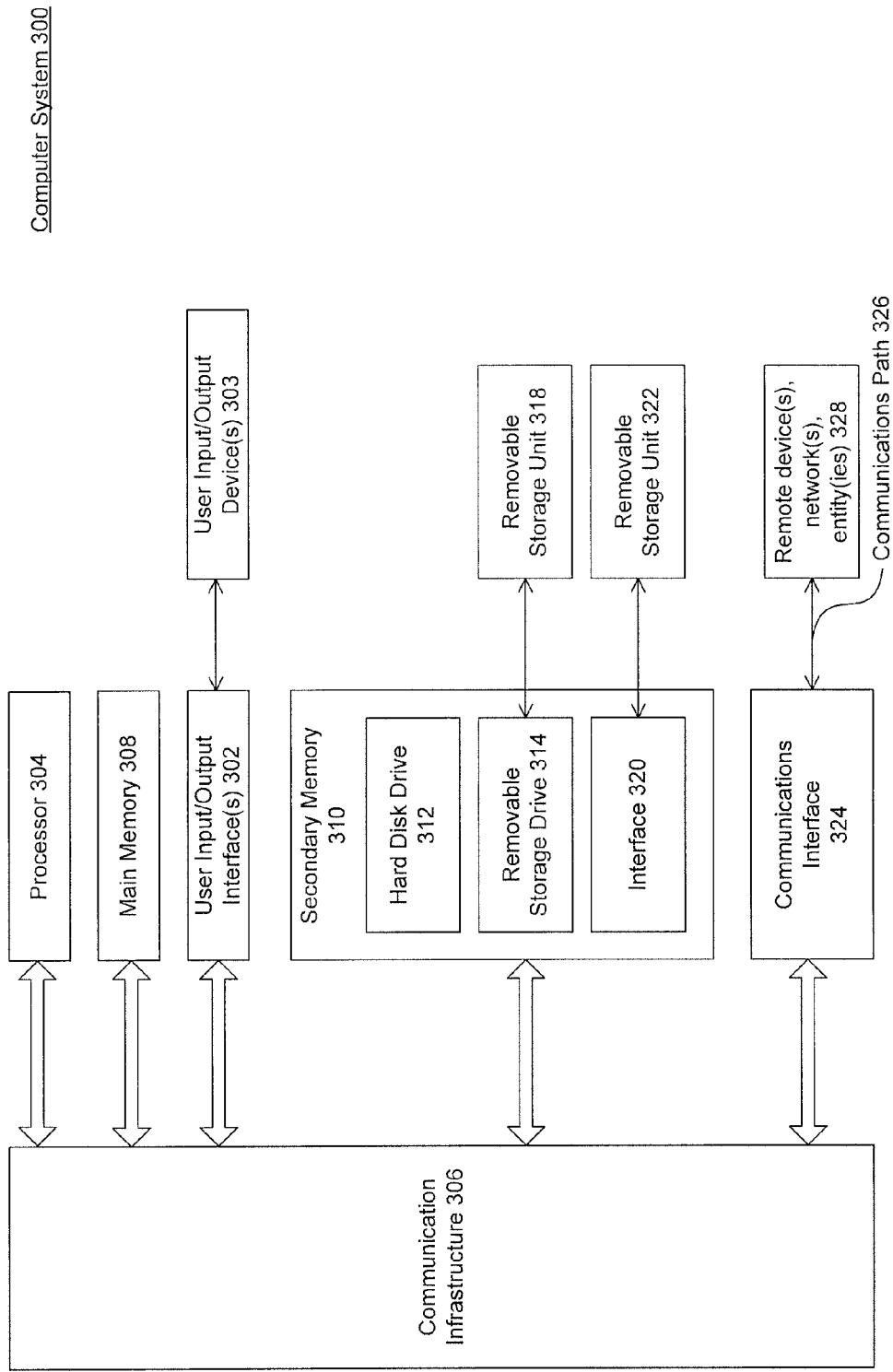
FIG. 3 is an example computer system useful for implementing various embodiments.

Various embodiments can be implemented, for example, using one or more well-known computer systems, such as computer system 300 shown in FIG. 3. Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 3. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising: receiving a request to add a new value to a first bitmap, wherein the first bitmap includes a first plurality of bits, each of the first plurality of bits corresponding to one or more values of a data structure, wherein one or more readers are accessing the first plurality of bits, and wherein includes a bit sequence corresponding to a most recently added value; determining that the first bitmap has exceeded a threshold, wherein the threshold indicates when a new bitmap is to be generated; generating a second bitmap, the second bitmap including a second plurality of bits that is more than the first plurality of bits, each of the second plurality of bits corresponding to one or more values of the data structure, including the new value, and wherein the second bitmap is below the threshold, wherein the first bitmap remains available during the generating of the second bitmap; and deleting the first bitmap based upon a determination that there are no more readers accessing the first plurality of bits, wherein the second bitmap is available prior to the deleting.

2. The method of claim 1, wherein the data structure is a data dictionary corresponding to values of one or more documents of a document store.

3. The method of claim 1, wherein the determining that the first bitmap has exceeded the threshold comprises: hashing the new value to the first bitmap; and determining which bit of the first bitmap to which the new value hashes based on the hashing.

4. The method of claim 1, further comprising: receiving a read request from a reader subsequent to the generating; and directing the reader associated with the read request to the second bitmap.

5. The method of claim 1, wherein the generating is performed without locking either the first bitmap or the second bitmap.

6. The method claim 1, further comprising: receiving a query request for a queried value; determining which bit of first bitmap or second bitmap corresponds to the queried value; determining that the bit is not set; and communicating that the queried value does not exist in the data structure.

7. The method claim 1, further comprising: receiving a query request for a queried value; determining which bit of first bitmap or second bitmap corresponds to the queried value; determining that the bit is set; and searching the data structure for the queried value.

8. The method of claim 1, wherein the threshold indicates a maximum number of values that can be assigned to any one bit of the first bitmap.

9. The method of claim 1, wherein the deleting comprises: monitoring the number of readers accessing the first bitmap, wherein new read requests are directed to the second bitmap; and determining that the number of readers drops to zero.

10. The method of claim 1, wherein the generating comprises: mapping values of the data structure to the second bitmap, wherein a read request received during the mapping is processed using the first bitmap.

11. A system, comprising: a memory; and at least one processor coupled to the memory and configured to: receive a request to add a new value to a first bitmap, wherein the first bitmap includes a first plurality of bits, each of the first plurality of bits corresponding to one or more values of a data structure, wherein one or more readers are accessing the first plurality of bits; determine that the first bitmap has exceeded a threshold, wherein the threshold indicates when a new bitmap is to be generated; generate a second bitmap, the second bitmap including a second plurality of bits that is more than the first plurality of bits, each of the second plurality of bits corresponding to one or more values of the data structure, including the new value, and wherein the second bitmap is below the threshold, wherein the first bitmap remains available during the generating of the second bitmap; and delete the first bitmap based upon a determination that there are no more readers accessing the first plurality of bits, wherein the second bitmap is available prior to the deleting.

12. The system of claim 11, wherein the data structure is a data dictionary corresponding to values of one or more documents of a document store.

13. The system of claim 11, wherein the processor configured to determine that the first bitmap has exceeded the threshold is configured to: hash the new value to the first bitmap; and determine which bit of the first bitmap to which the new value hashes based on the hash.

14. The system of claim 11, wherein the processor is further configured to delete is configured to: monitor the number of readers accessing the first bitmap; and determine that the number of readers drops to zero.

15. The system of claim 11, wherein the processor is further configured to: receive a read request from a reader subsequent to the generating; and direct the reader associated with the read request to the second bitmap.

16. The system of claim 11, wherein the processor is configured to generate the second bitmap without locking the first bitmap.

17. The system of claim 11, wherein the processor is further configured to: receive a query request for a queried value; determine which bit of first bitmap or second bitmap corresponds to the queried value; determine that the bit is not set; and communicate that the queried value does not exist in the data structure.

18. The system of claim 11, wherein the processor is further configured to: receive a query request for a queried value; determine which bit of first bitmap or second bitmap corresponds to the queried value; determine that the bit is set; and search the data structure for the queried value.

19. The system of claim 11, wherein the threshold indicates a maximum number of values that can be assigned to any one bit of the first bitmap.

20. A tangible non-transitory computer-readable device having instructions stored thereon that, when executed by at least one computing device, causes the at least one computing device to perform operations comprising: receiving a request to add a new value to a first bitmap, wherein the first bitmap includes a first plurality of bits, each of the first plurality of bits corresponding to one or more values of a data structure, wherein one or more readers are accessing the first plurality of bits; determining that the first bitmap has exceeded a threshold, wherein the threshold indicates when a new bitmap is to be generated; generating a second bitmap, the second bitmap including a second plurality of bits that is more than the first plurality of bits, each of the second plurality of bits corresponding to one or more values of the data structure, including the new value, and wherein the second bitmap is below the threshold, wherein the first bitmap remains available during the generating of the second bitmap; and deleting the first bitmap based upon a determination that there are no more readers accessing the first plurality of bits, wherein the second bitmap is available prior to the deleting.

* * * * *